Figures 5, 6:
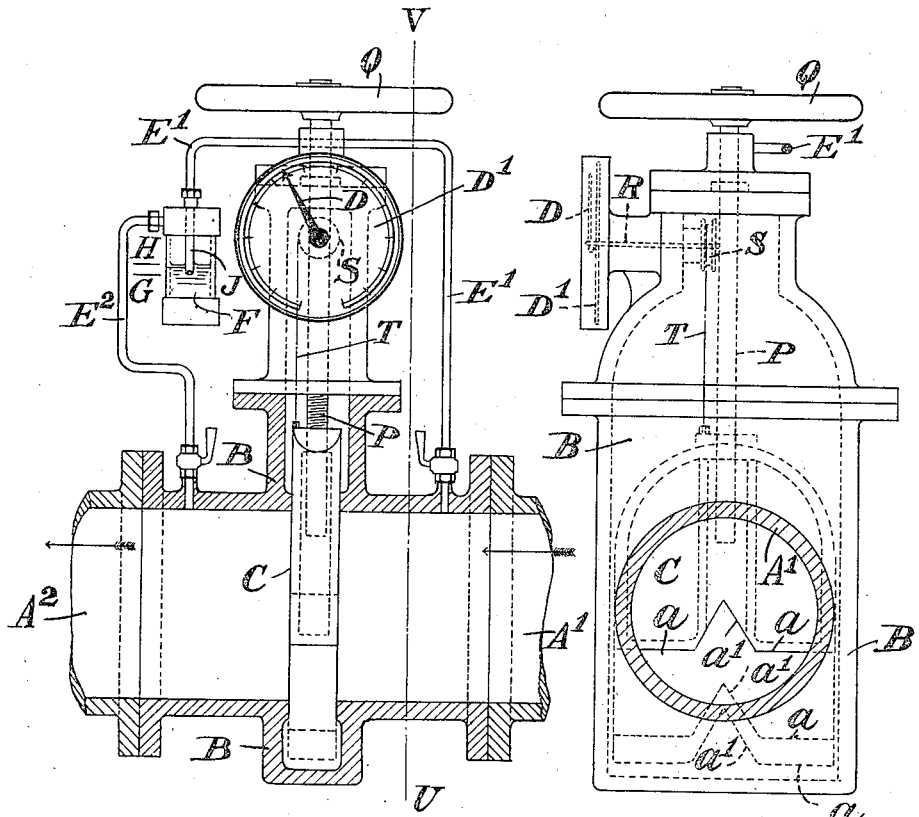

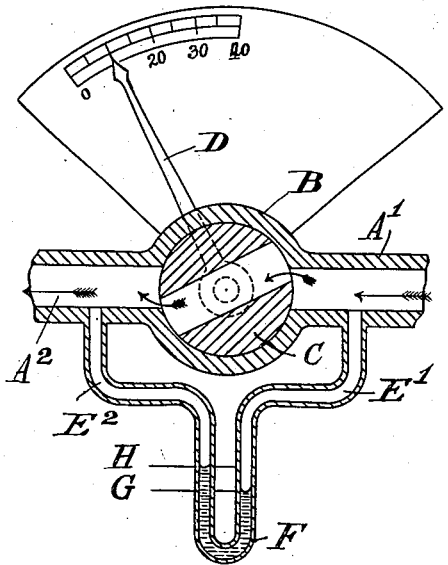
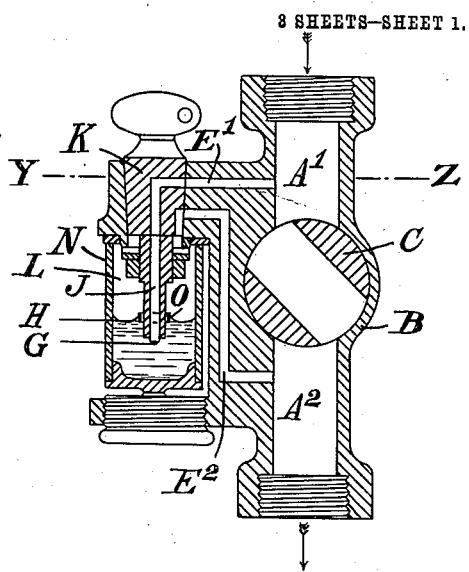
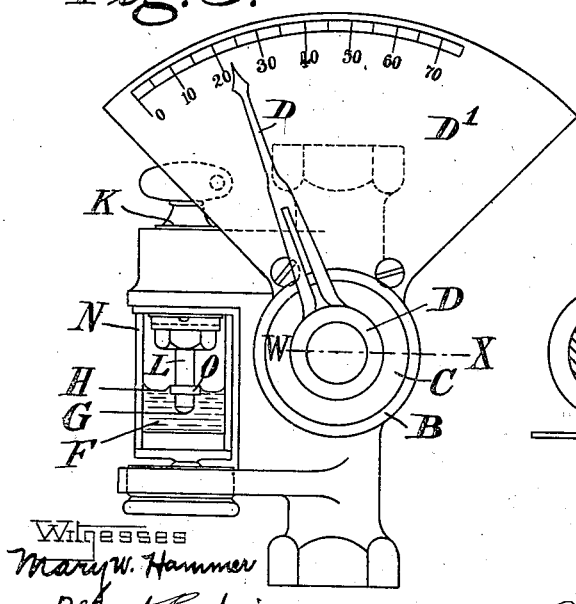
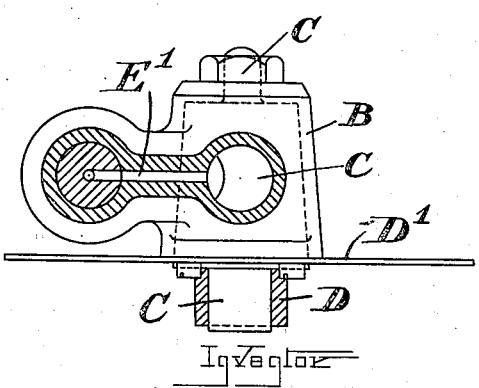

G. J. GIBBS.
APPARATUS FOR INDICATING OR MEASURING THE RATE OF FLOW OF FLUID THROUGH PIPES, OR FOR DETECTING LEAKAGE.
APPLICATION FILED DEC. 10, 1909.

1,098,247.

Patented May 26, 1914.

3 SHEETS—SHEET 3.

Witnesses
Mary W. Hammer.
Albert Popkins

Inventor
George James Gibbs
By Sturtevant & Mason
Attys

UNITED STATES PATENT OFFICE.

GEORGE JAMES GIBBS, OF PRESTON, ENGLAND.

APPARATUS FOR INDICATING OR MEASURING THE RATE OF FLOW OF FLUID THROUGH PIPES, OR FOR DETECTING LEAKAGE.

1,098,247.   Specification of Letters Patent.   Patented May 26, 1914.

Application filed December 10, 1909. Serial No. 532,346.

*To all whom it may concern:*

Be it known that I, GEORGE JAMES GIBBS, a subject of the King of Great Britain, residing at Preston, in the county of Lancaster, in the Kingdom of England, have invented certain new and useful improvements in apparatus for indicating or measuring the rate of flow of fluid through pipes, or for detecting leakage, of which the following is a specification.

This invention relates to apparatus for indicating or measuring the rate of flow of fluids, through pipes, and provides means whereby a wide range of rates of flow may be conveniently indicated and measured.

In carrying the invention into effect, I indicate or measure the rate of flow of fluid passing through a pipe by disposing in such pipe a hand-operated valve or controlling device, which can be more or less opened or closed at the moment of making an observation, to throttle more or less the stream of fluid, and employing in combination with such valve, a device adapted to indicate on any convenient scale or dial, the amount of such opening or closing necessary to produce a certain definite prearranged small loss of pressure due to such temporary or momentary throttling. I employ this indicated amount of opening or closing as my measure of the rate at which the fluid is passing through the pipe. The dial or scale is graduated in any convenient units, and the graduations refer only to that particular pressure drop or loss for which they have been marked. When the apparatus is used to measure the rate of flow of an expansive fluid such as air or steam the dial or scale may be graduated with a multiplicity of scales to cover any desired range of working pressures of the expansive fluid but referring only to that particular pressure drop for which they are graduated. The definite prearranged small pressure drop for which a scale of the apparatus is graduated may be indicated by any convenient device such as a manometer U tube or by pressure gages.

It is common knowledge that measurements of varying rates of flow may be made by means of the varying pressure drop caused by the throttling of the stream through constricted orifices or other forms of obstruction to the stream. Tapering passage ways in combination with automatic floating vanes whose displacements are due to the varying rates of flow are also used to indicate such rates of flow. Inefficient stop valves—the inefficiency causing a measurable pressure drop—have also been proposed for the same purpose. All such devices entail a permanent and constant obstruction or inefficiency and excepting the floating vane devices fail to indicate rates of flow which are small in comparison with their full capacity. I make my hand operated throttling device so efficient that excepting at such times as observations are actually being made the inefficiency and consequent pressure drop is practically *nil* even at the highest rates of flow within the capacity of the pipe to which my devices are applied and my particular combinations enable me to measure the most minute rates of flow even through pipes of very great capacity. My devices depend entirely upon movements of the throttling member imparted by the hand of the observer, and the indications of rates of flow are measured entirely with reference to the amount of such movements, as shown upon a dial; in conjunction with a predetermined pressure difference indicated by the manometer.

The invention will be understood from the following description, reference being had to the accompanying drawings, in which:—

Figure 7:
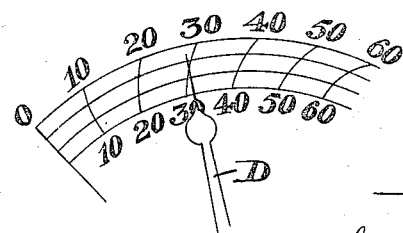
Figures 8, 9:
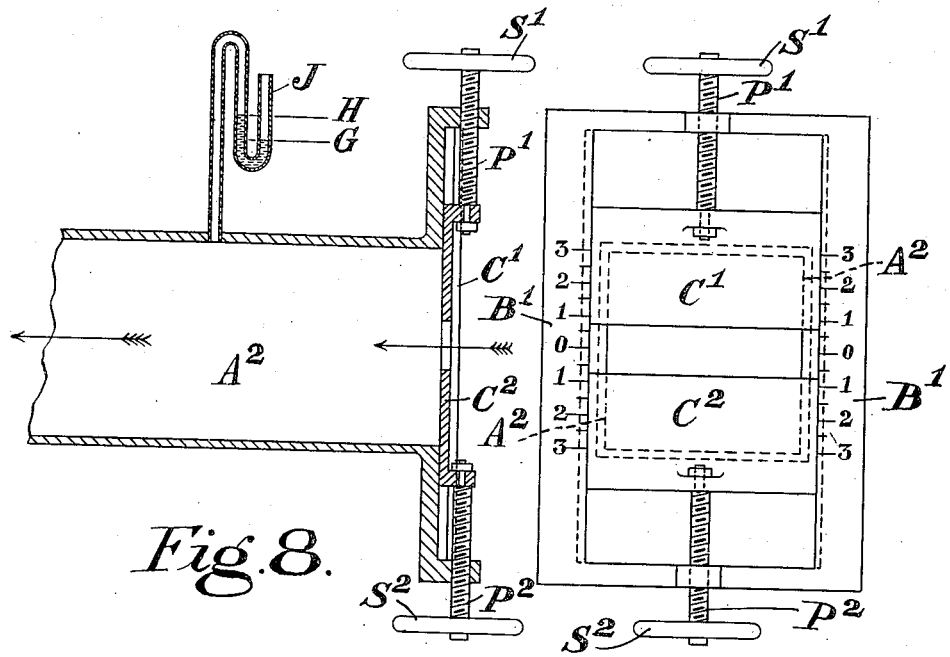
Figure 10:
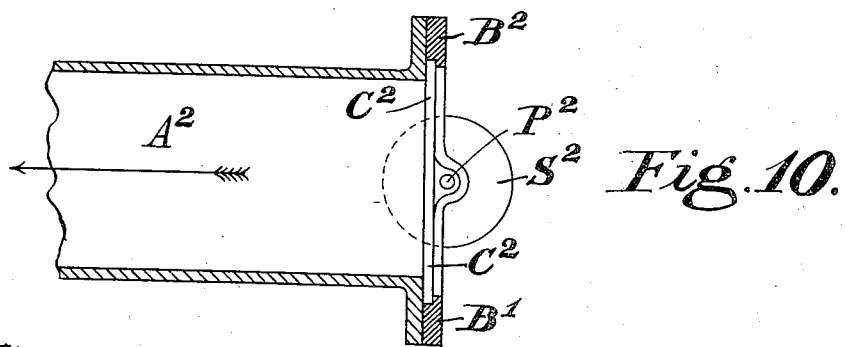

Figure 1 is a section of one form of the apparatus; Figs. 2, 3 and 4 are vertical section, front elevation and cross section respectively of another form, the part at one side of the dial D' in Fig. 4 being a cross section on line Y Z, (Fig. 2), and the part at other side of the dial D' being a cross section on line W X, (Fig. 3). Figs. 5 and 6 are front sectional elevation, and end sectional elevation; showing one method of applying the invention to valves of the sluice gate type. Fig. 7, shows a portion of a dial with multiple scales. Figs. 8, 9 and 10 are respectively, sectional elevation, end view and sectional plan of another form or application of the invention.

In Fig. 1, A', A² is the pipe through which the fluid is passing in the direction indicated by the arrows from the source of supply to the consuming apparatus. B is the body of a plug cock of which C is the plug which can be turned within the body in the usual manner to open or close more or less the passage for the fluid. The index finger D is rigidly attached to the plug C and indicates primarily the amount of opening of the passage way, zero on the scale corresponding exactly to the position of the plug when the passage is just completely closed. $E'$ $E^2$ are two small tubes in connection with the pipe $A'$, $A^2$, one on each side of the stop cock body B; these tubes communicate respectively, as shown, with the two legs of the manometer F, which, for my purpose is not provided with the usual graduated scale but has two marks only G and H to represent one definite difference of level of the columns of liquid in the two legs of the manometer. By more or less closing the passage way through the cock, the difference of level of the two columns of liquid can be made equal to the distance between the two lines G and H, because as the passage of the fluid from $A'$ to $A^2$ is more or less throttled, the difference of pressures of the fluid in $A'$ and $A^2$ will be more or less. The small pressure difference indicated by the difference of level of the two columns of liquid in the manometer F represents the "head" which drives the stream of fluid through the constriction of the cock. To produce the one definite pressure difference when a small quantity of fluid is passing, the passage will have to be more constricted than it will when a large quantity is passing, in other words the cock must be more open and the index D will point to a larger figure on the dial in the latter case than in the former. The dial is preferably graduated by connecting the device in series with some standard measuring apparatus and marking the various points on the dial with reference to the indications of such standard. I sometimes use a common gas meter and pass the gas or air through the meter and my measuring device consecutively, always taking care when making comparisons that the index D is set to such a position that the definite pressure difference G H is indicated by the manometer F. Figs. 2, 3 and 4 show another arrangement in which the letters correspond to the same parts as in Fig. 1. $E'$ is a small passage communicating from the pipe $A'$, to the vertical tube J through a passage formed in the body of the small plug cock K; $E^2$ is another small passage communicating from the pipe $A^2$ to the space L through passages formed in the side of and beneath the plug of the cock K. The manometer consists of a glass tube N closed at each end and partially filled with water into which the lower end of the tube J dips. The space above the water is in connection with the pipe $A^2$ through the passage $E^2$ and the tube J is in connection with the pipe $A'$ through the passage $E'$ so that when any gas is flowing through the pipes $A'$ $A^2$ and the cock C is sufficiently closed, the pressure in $A'$ will be greater than the pressure in $A^2$ by an amount which is sufficient to cause a bubble of gas to appear at the end of the tube J. The difference of level G H then represents the constant pressure difference to which the dial indications refer. So long as a constant quantity of water is contained in the glass tube or chamber the bubble will appear when one constant pressure drop exists and the correct quantity of water may always be observed with regard to marks made on the side of the glass tube for that purpose. I do not restrict myself to any particular pressure difference but any one scale on the dial refers only to that one particular pressure difference for which it has been made, and I preferably employ such a small pressure difference that it is a negligible proportion of the total working pressure of the fluid to be measured. The particular pressure difference for which the dial is graduated would in some cases be noted on the dial for permanence of record, for instance in inches of water or lbs. per sq. inch, while in the case of such manometers as are described with reference to Figs. 1 and 2 the lines G H would preferably be marked on the glass or in the particular form of manometer described with reference to Fig. 2, I prefer to place or form a ring or collar O around the tube J to serve as a very definite and easily distinguished gage of the depth the tube J should dip into the water. The plug K is capable of being rotated about its vertical axis to interrupt the passages $E'$ $E^2$ to prevent the working pressure of the fluid in the pipe $A'$ from driving it furiously through the liquid in the manometer chamber when the cock C is completely closed. In the manometer tube or chamber I may use other fluids than water, for instance when I am measuring the flow of steam or water through the pipe $A'$ $A^2$ I prefer to put mercury into the bottom of the glass tube or chamber N and when the prearranged pressure drop exists water can be seen bubbling up through the surface of the mercury; in such cases the small pipes and upper part of the glass tube are filled with water.

In Figs. 5 and 6, $A'$ and $A^2$ are the pipes conveying the fluid to and from the stop valve which in this case is a sliding gate or sluice C which slides in a gate holder B and which may be opened and closed in any customary manner e. g. by means of the screw P and hand wheel Q. The amount of opening of the sluice C is indicated by the index finger D on the dial $D'$, the index finger being carried on the spindle R on which is fixed the pulley S; the cord T connects the sluice C with the pulley S and thus any motion of the sluice C is indicated on the dial $D'$, and the finger D is so arranged as to stand at zero on the dial scale when the passage way past the sluice is completely closed. The manometer F (Fig. 5) is constructed substantially as shown in Fig. 2, and the connecting pipes E' E² are each provided with a small stop cock, for the purpose of cutting off all connection between the pipes A' A² and the manometer when it is so desired. The dial D' should be preferably graduated with reference to a standard volumetric meter as described above in relation to Figs. 1, 2 and 3. To add to the sensitiveness of the instrument especially when fluid is passing at a very small rate I sometimes give a special form to the closing edge a a of the sluice so that a comparatively long travel of the sluice C and index D may correspond to small change of area of passage way through the stop valve, by this means the sensitiveness of the instrument may be conveniently increased, a a' shows such a special form of sluice in three positions, viz. about half open, and nearly and completely closed respectively. Referring to Fig. 5 the pipe A' A² may be an existing gas or water main, or the like, fitted with a stop valve with, as is sometimes the case, a device for indicating the amount of opening of the valve; to such I add the pipes E' E² and manometer, or differential pressure gage, to show when one predetermined difference of pressure exists in the fluid passing through the pipes A' A² and I then use the indicated amount of opening of the valve as a measure of the rate at which fluid is passing through the pipe as described above.

Another form of the invention is shown by Figs. 8, 9, 10; this arrangement is particularly useful for measuring the rate of flow of air to or from any apparatus as for instance an air compressor or blower. To measure the air passing into such machines the pipe A² is connected to the inlet passage of the machine so that when the machine is working, all the air passing into it goes in through the space between the sluices C' C² which slide across the mouth of the pipe A² being guided by the guides B' B² and advanced or withdrawn by means of the screws P' P² and the hand wheels S' S². The sluices or guides are provided with scales so that the amount of opening can be accurately measured, or the scales may be graduated empirically with reference to any convenient measuring apparatus or to a meter previously standardized to read directly the rate of flow in any convenient units. When the passage way between the sluices is sufficiently constricted the pressure within the pipe A² will be less than the pressure of the atmosphere by the constant amount indicated on the manometer F as shown by the lines G, H, the leg J being at its extremity open to the atmosphere; the scale reading on either B' or B² would then be the measure of the rate of flow of air into the pipe A² and therefore to the air compressor or blower.

When the instrument is to be used with expansive fluids under a wide range of working pressures I prefer to provide a range of graduated arcs on the dials each graduated for one particular working pressure as shown in Fig. 7, in which the index D extends over the four lines of scales $a$, $b$, $c$ and $d$ drawn and each scale refers to one particular working pressure of the fluid in the pipe A' A², Figs. 1, 2, 5. Like points on each scale are then joined by curves as shown, 10—10, 20—20, et cetera, whence the dial indications are made available for intermediate pressures. It should be clearly understood that any particular scale or range of scales on a dial, refers only to one particular difference of pressure in the pipes or passages E' E², i. e. at the manometer or pressure difference indicating device.

This invention is particularly useful for measuring the rate of flow of gas or air through pipes, and for showing whether leakages exist in the pipes, as no rate of flow is so small that it cannot be detected and measured, for the passage through the cock or valve can always be more and more closed and constricted until the required pressure difference is attained, and even when the throttling device is completely closed the minutest imaginable leak which is ordinarily unmeasurable will cause a bubbling through the liquid in the manometer tube shown in Figs. 2, 3 and 5 and after experience or comparison with an ordinary volumetric meter the rate of bubbling can be used as an approximate indication of the amount of such leakage.

Any suitable arrangement of tubes E' E², and any convenient form of instrument or instruments for indicating the pressure differences may be used.

In practice the method of using instruments constructed according to my invention is as follows:—The main cock or sluice C being fully open, the passages E' E² also open and a stream of fluid under any working pressure passing from any source of supply through the pipes A' A² to the consuming apparatus, then at such time as it is desired to know the rate at which the fluid is passing through the pipe A' A² the cock or sluice C is gradually closed until the pressure in the pipe A² falls below the pressure in the pipe A' by the predetermined amount which is indicated on and by the manometer or other differential pressure indicating device. Then, the dial having been previously graduated, the index finger D will show on the dial the rate at which fluid is passing.

I declare that what I claim is:—

1. In apparatus for measuring and indicating the rate of flow of fluid passing through a pipe, the combination with the pipe of a hand operated throttle valve disposed therein, an index and means for moving it in conjunction with the throttle valve, a dial coöperating with the index to indicate the amount of opening of the throttle valve and a device for indicating the definite prearranged small pressure drop for which the dial is graduated or calibrated.

2. In an apparatus of the character described including a throttling valve, a manometer comprising a chamber with transparent walls partly filled with liquid, a small tube connecting the space in said chamber above the liquid with the pipe at the outlet side of the valve, a second small tube branching from the pipe at the inlet side of the valve and dipping down into the liquid in the chamber in such manner that when the main stream is throttled by the valve a bubble will appear at the end of the second small tube in the liquid when the predetermined pressure difference exists.

3. In apparatus for measuring or indicating the rate of flow of a fluid passing through a pipe, to any consuming apparatus, such pipe having a hand operated valve disposed therein, the combination therewith of a manometer embodying a U-tube communicating with the pipe at each side of the valve, the said manometer having marks G H to represent the prearranged difference of level of the two columns of liquid or to indicate the correct quantity of liquid in the manometer.

4. In apparatus for measuring or indicating the rate of flow of a fluid passing through a pipe to any consuming apparatus, such pipe having a throttling valve disposed therein, the combination therewith of a manometer, embodying a chamber having tubes which communicate respectively from above the liquid in the chamber, and below the surface of the liquid therein, with the pipe at either side of the valve, the said manometer having marks G H to represent the pre-arranged difference of level of the two columns of liquid or to indicate the correct quantity of liquid in the manometer.

In witness whereof, I have hereunto signed my name this 30th day of November 1909, in the presence of two subscribing witnesses.

GEORGE JAMES GIBBS.

Witnesses:
G. C. DYMOND,
T. S. SHILLINGTON.